(12) United States Patent  (10) Patent No.: US 8,977,960 B2
Vigier et al.  (45) Date of Patent: Mar. 10, 2015

(54) SYSTEM AND A METHOD IN A COMPUTER-ENABLED ENVIRONMENT FOR ESTABLISHING AND MANAGING SEPARATE REPUTATIONS FOR A USER AND HIS AVATAR

(71) Applicants: Pierre Vigier, Nanjing (CN); Stephane Tougard, Nanjing (CN)

(72) Inventors: Pierre Vigier, Nanjing (CN); Stephane Tougard, Nanjing (CN)

(73) Assignee: Bootic, Inc., Palo Alto, CA (US)

( * ) Notice: Subject to any disclaimer, the term of this patent is extended or adjusted under 35 U.S.C. 154(b) by 341 days.

(21) Appl. No.: 13/625,574

(22) Filed: Sep. 24, 2012

(65) Prior Publication Data

US 2014/0089820 A1  Mar. 27, 2014

(51) Int. Cl.
*G06F 3/0481* (2013.01)
*G06F 17/30* (2006.01)
*G06N 3/00* (2006.01)

(52) U.S. Cl.
CPC ..... *G06F 3/04815* (2013.01); *A63F 2300/5553* (2013.01); *A63F 2300/5546* (2013.01); *G06F 17/3053* (2013.01); *G06N 3/006* (2013.01)
USPC ........... 715/706; 715/757; 709/204; 705/27.2

(58) Field of Classification Search
CPC ............... G06F 3/04815; G06N 3/006; A63F 2300/553; A63F 2300/5546
USPC .................. 715/757, 706; 709/204; 705/27.2
See application file for complete search history.

(56) References Cited

U.S. PATENT DOCUMENTS

| | | | |
|---|---|---|---|
| 2009/0247297 A1* | 10/2009 | Nakamura et al. | 463/31 |
| 2010/0083112 A1* | 4/2010 | Dawson et al. | 715/706 |
| 2010/0145801 A1* | 6/2010 | Chekuri | 705/14.51 |
| 2010/0180216 A1* | 7/2010 | Bates et al. | 715/757 |
| 2011/0083086 A1* | 4/2011 | Brownlow et al. | 715/753 |
| 2012/0136923 A1* | 5/2012 | Grube | 709/203 |
| 2013/0045804 A1* | 2/2013 | Ruke | 463/42 |
| 2013/0097678 A1* | 4/2013 | Farsedakis | 726/5 |
| 2013/0110952 A1* | 5/2013 | Dawson et al. | 709/206 |
| 2013/0159069 A1* | 6/2013 | Kawanaka et al. | 705/12 |
| 2013/0283191 A1* | 10/2013 | Finn et al. | 715/757 |

\* cited by examiner

*Primary Examiner* — Ting Lee

(74) *Attorney, Agent, or Firm* — Tyler J. Sisk; Casimir Jones, S.C.

(57) ABSTRACT

A system and a method in a computer-enabled environment are provided. The method includes the following steps: determining a user reputation of a user designator in response to a user rank of the user designator and an avatar rank of each of at least one avatar designator which is associated with the user designator; and determining an avatar reputation of that avatar designator in response to the avatar rank of that avatar designator and the user rank of the user designator, wherein the user designator corresponds to a real world user, the avatar designator corresponds to a user function in a visualized world of the computer-enabled environment, and each of the at least one avatar designator is manipulatable by the real world user.

12 Claims, 2 Drawing Sheets

US 8,977,960 B2

SYSTEM AND A METHOD IN A COMPUTER-ENABLED ENVIRONMENT FOR ESTABLISHING AND MANAGING SEPARATE REPUTATIONS FOR A USER AND HIS AVATAR

TECHNICAL FIELD

The present invention generally relates to computer-enabled environments, and more particularly relates to a system and a method in a computer-enabled environment for establishing and maintaining separate reputations for a user and his avatar(s).

BACKGROUND

In a computer-enabled environment, an avatar may be a virtual representation of a real world user and the avatar may have a reputation associated with it. The reputation may be represented by a symbol, a number or even a term such as noob, advanced user, etc.

The real world user takes action in the computer-enabled environment by controlling the avatar with a keyboard, a cursor, or the like. The user may control the avatar to interact with another avatar controlled by another user and the way that the avatar interacts with the other avatar may depend at least in part on the nature and the purpose of the computer-enabled environment.

The reputation of the avatar may vary in response to the actions which the user has taken. Accordingly, the reputation of the avatar is considered as the user's reputation. However, if the avatar is transferred to another user, the reputation of that avatar would follow the avatar. In other words, the original user of the avatar will lose the reputation of that avatar and the new user will obtain the reputation of that avatar.

Thus, what is needed is separate reputations for a real world user and his avatar(s) which eliminates the problems associated with creation or transfer of avatars. Furthermore, other desirable features and characteristics will become apparent from the subsequent detailed description and the appended claims, taken in conjunction with the accompanying drawings and this background of the disclosure.

SUMMARY

A system in a computer-enabled environment is provided. The system includes a user designator corresponding to a real world user. The user designator has a user reputation and a user rank associated therewith. The system also includes at least one avatar designator corresponding to a user function in a visualized world of the computer-enabled environment. The avatar designator has an avatar reputation and an avatar rank associated therewith. Each of the at least one avatar designator is associated with the user designator and is manipulatable by the real world user.

A method in a computer-enabled environment is provided. The method includes determining a user reputation of a user designator in response to a user rank of the user designator and an avatar rank of each of at least one avatar designator associated with the user designator. The method also includes determining an avatar reputation of that avatar designator in response to the avatar rank of that avatar designator and the user rank of the user designator. The user designator corresponds to a real world user and the avatar designator corresponds to a user function in a visualized world of the computer-enabled environment. Each of the at least one avatar designator is manipulatable by the real world user.

DETAILED DESCRIPTION

Various embodiments relate to a system and a method in a computer-enabled environment for establishing separate reputations of a user and his avatar(s).

Figure 1:
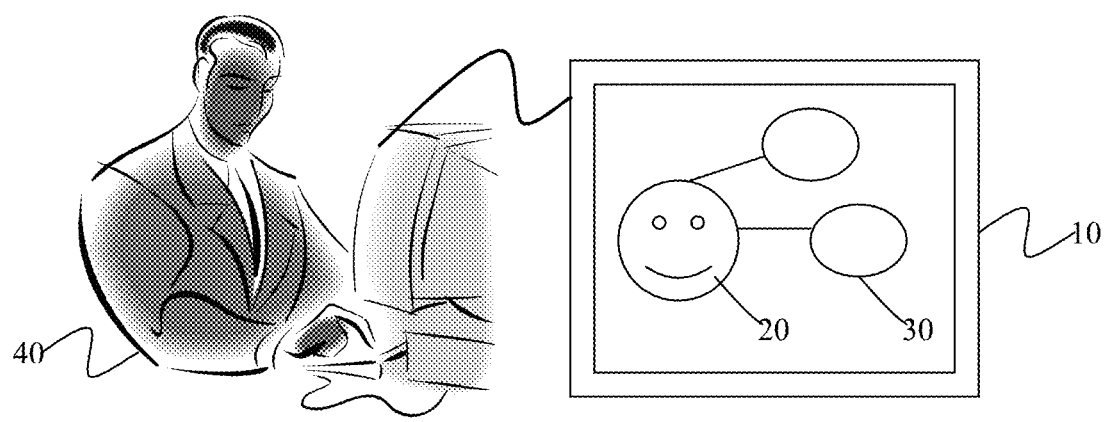
FIG. 1 is a schematic diagram of a system in a computer-enabled environment in accordance with an embodiment.

Referring to FIG. 1 and in accordance with one embodiment, a computer-enabled environment 10 includes a user designator 20 and at least one avatar designator 30. The user designator corresponds to a real world user 40. The user designator 20 has a user reputation and a user rank associated therewith. The user rank is represented by a number, a level or any other presentation. The user reputation is represented by a number, a symbol, a term or any other similar presentation. The avatar designator 30 corresponds to a user function in a visualized world of the computer-enabled environment. The user function is a function the real world user can controllably provide to either the user designator or the avatar designator in the computer-enabled environment and may correspond to an action function, a thinking function, or any other function that the real world user can perform or imagine to perform in the real world. The visualized world corresponds to a virtual world in the computer-enabled environment, wherein the virtual world may be an internet forum, a trade platform, a virtual world in a computer game, or a social community. The avatar designator 30 has an avatar reputation and an avatar rank associated therewith for identifying the avatar designator in that visualized world. The avatar rank may be represented by a number, a level or any other presentation. The avatar reputation may be represented a number, a symbol, a term or any other presentation. Each avatar designator 30 may be associated with the user designator 20 such that each avatar designator 30 can be manipulatable by the real world user 40 either directly or indirectly through the user designator 20.

In accordance with the present embodiment, the user reputation is determined in response to the user rank of the user designator 20 and the avatar rank of each avatar designator 30 associated therewith. The user rank and the avatar rank are determined in response to the nature or purpose of the computer-enabled environment and the user designator and/or the avatar designator's action within that computer-enabled environment. For example, each time the user designator 20 takes action or encounters an event in the computer-enabled environment, the user rank of the user designator 30 may vary either negatively or positively. Likewise, each time the avatar designator 30 takes action or encounters an event in the computer-enabled environment, the avatar rank of the avatar designator 30 may vary either negatively or positively. In accordance with the present embodiment, the user rank and the avatar rank are determined independently. The avatar reputation is determined in response to the avatar rank of that avatar designator 30 and the user rank of the user designator 30 associated therewith.

In accordance with another aspect of the present embodiment, an avatar designator associated with one user designator may be transferred away to another user designator and the user reputation of the user designator may be decreased in response to a transfer-away of an avatar designator associated therewith. For example, the transfer may include forms of selling, exchanging, giving away for free, paying for debit. The user reputation of the user designator may be decreased because of the loss of the avatar designator and thus the loss of the avatar reputation and/or the avatar rank associated therewith. The user reputation may also be increased in response to a receipt of a transferred avatar designator, such as the user reputation of the user designator being increased because of the gain of the avatar designator and thus the gain of the avatar reputation and/or the avatar rank associated therewith.

In accordance with the present embodiment, the user reputation is determined in response to a set-up of a new avatar designator. A set-up of a new avatar designator includes creation of a new avatar designator in the computer-enabled environment. A new avatar rank of the new avatar designator may be zero or some value greater or less than zero depending on the nature or purpose of the computer-enabled environment. A new avatar reputation of the new avatar designator is usually greater than zero as it is determined in response to the user rank of the user designator associated therewith.

In accordance with the present embodiment, the avatar reputation may be increased in response to a transfer of that avatar designator to a new user designator having a new user reputation greater than a previous user reputation of a previous user designator. Likewise, the avatar reputation may be decreased in response to a transfer of that avatar designator to a new user designator having a new user reputation less than a previous user reputation of a previous user designator.

Figure 2:
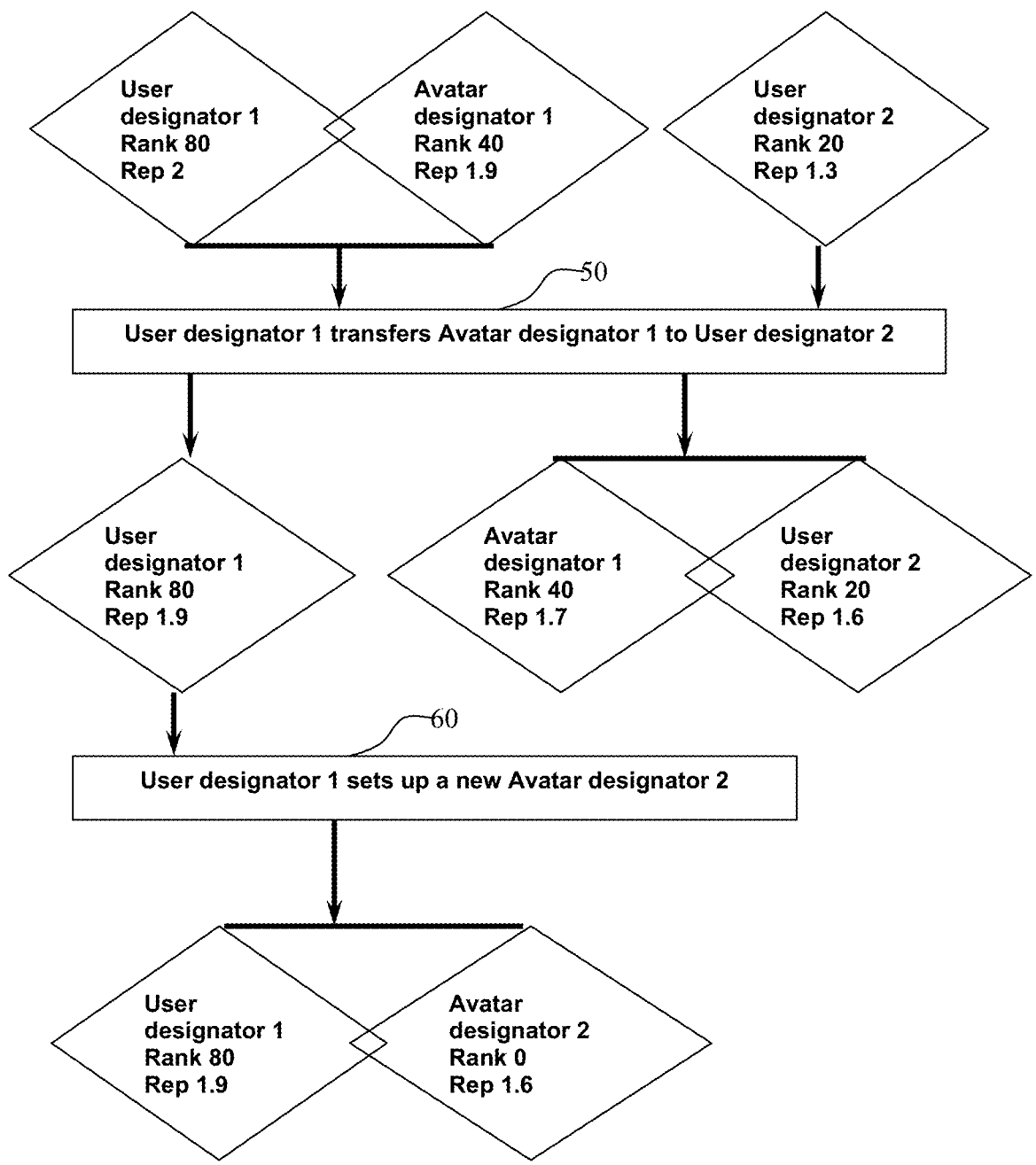
FIG. 2 is a flow diagram of a method for determining a user reputation and an avatar reputation in accordance with an embodiment.

Referring to FIG. 2, a flow diagram of a method for determining a user reputation and an avatar reputation in accordance with the present embodiment is depicted. It is to be understood that in the present embodiment, the user rank and the avatar rank are represented by a number; however, in some other embodiments, the user rank and the avatar rank could be represented by a different means, for example, a level such that the user reputation and the avatar reputation can be determined in response to the user rank and the avatar rank. It is also to be understood that the user rank may be represented differently than the avatar rank. Additionally, it is to be understood that in the present embodiment, the user reputation and the avatar reputation are represented by a number; however, in some other embodiments, the user reputation and the avatar reputation could be represented by a different means, such as, a level, an image, or a term. For instance, the user reputation and the avatar reputation may be represented by a term, such as noob for new users and advanced user for experienced users. It is also to be understood that the user reputation may be represented differently than the avatar reputation.

In accordance with the present embodiment, the user reputation may be determined by a logarithm of a total user rank. The total user rank may be determined by summing or some other combination of the user rank and a 1/x portion of each of the at least one avatar rank, wherein x is greater than one. The avatar reputation may be determined by a logarithm of a total avatar rank. The total avatar rank may be determined by summing or some other combination of the avatar rank and a 1/x portion of the user rank, wherein x is greater than one. For example:

$$\text{Total user rank} = \text{user rank} + 1/x \Sigma \text{each avatar rank} \quad (1)$$

$$\text{User Reputation} = \log(\text{Total user rank}) \quad (2)$$

$$\text{Total avatar rank} = \text{avatar rank} + 1/x \text{ user rank} \quad (3)$$

$$\text{Avatar Reputation} = \log(\text{Total avatar rank}) \quad (4)$$

In accordance with the present embodiment as described in FIG. 1, only one avatar is considered and the 1/x portion of the avatar rank is set to ½ as an example. It is to be understood that the total user rank and the total avatar rank can be determined in response to other forms of the user rank and the avatar rank. It is also to be understood that the user reputation and the avatar reputation can be determined in response to other forms of the user rank and the avatar rank. In accordance with the present embodiment, the user reputation is determined by a following logarithm of a total user rank:

$$\text{Total user rank} = \text{user rank} + 1/x \sum \text{each avatar rank} \quad (5)$$

$$\text{User reputation} = \frac{(\log(\text{Total user rank} + 1)/\log(10)) \times 20}{(\text{Total user rank} + 40)/(\text{Total user rank} + 1)} \quad (6)$$

The avatar reputation may be determined by a following logarithm of a total avatar rank:

$$\text{Total avatar rank} = \text{avatar rank} + 1/x \text{ user rank} \quad (7)$$

$$\text{Avatar reputation} = \frac{(\log(\text{Total avatar rank} + 1)/\log(10)) \times 20}{(\text{Total avatar rank} + 40)/(\text{Total avatar rank} + 1)} \quad (8)$$

Additionally, in FIG. 2, the user rank and the avatar rank remain unchanged while the avatar designator is transferred away. It is to be understood that the user rank and the avatar rank may vary in dependence on the transfer-away of the avatar designator according to the nature and the purpose of the computer-enabled environment.

Referring to FIG. 2, User designator 1 (e.g. with user rank eighty) is associated with Avatar designator 1 (e.g. with avatar rank forty). Accordingly, the total user rank of User designator 1 is one hundred and the total avatar rank of Avatar designator 1 is eighty in accordance with the equations (1) and (3) shown above. Therefore, User designator 1 has a user reputation (Rep) of two based on the total user rank of one hundred according to equation (2). Avatar designator 1 has an avatar reputation (Rep) of 1.9 based on the total avatar rank of eighty according to equation (4). User designator 2 (e.g. with user rank 20) does not have any avatar designator. Accordingly, User designator 2 has a user reputation of 1.3 based on the total user rank of twenty according to equations (1) and (2).

At step 50, User designator 1 transfers Avatar designator 1 to User designator 2. The user rank of User designator 1 remains unchanged as eighty. The total user rank of User designator 1 decreases to eighty because of the loss of the avatar rank of Avatar designator 1 according to equation (1). Accordingly, the reputation of User 1 decreases to 1.9 according to equation (2). The user rank of User designator 2 remains unchanged as twenty. The total user rank of User designator 2 increases to forty because of the newly addition of the avatar rank of Avatar designator 1 according to equation (1). Accordingly, the reputation of User designator 2 increases to 1.6 according to equation (2). The avatar rank of Avatar designator 1 remains unchanged as forty. The total rank effect of Avatar designator 1 decreases to fifty because User designator 2 has less user reputation than User designator 1 according to equation (3). Accordingly, the reputation of Avatar designator 1 decreases to 1.7 according to equation (4).

At step 60, User designator 1, with the user reputation of 1.9, may create a new Avatar designator 2. The user rank of User designator 1 remains unchanged as eighty. The total user rank of User designator 1 increases to eighty because of the newly addition of the avatar rank of Avatar designator 2 according to equation (1). Accordingly, the reputation of User designator 1 increases to 1.9 according to equation (2). The avatar rank of Avatar designator 2 is set as zero in the present embodiment. The total avatar rank of Avatar designator 2 is forty because User designator 1 has contribution to the total avatar rank according to equation (3). Accordingly, the reputation of Avatar 2 is 1.6 according to equation (4).

An advantage of various embodiments is to provide separate reputations for user designators and avatar designators associated therewith. The user reputation and the avatar reputation can be determined independently; however, they may be inter-connected and influenced by each other. The computer-enabled environment disclosed can be more reflective of the real world.

An additional advantage of various embodiments is to enable partial or total transfer of an avatar designator without loss of the entire reputation of the user designator. Although the user reputation of the user designator may be affected by the transfer of the avatar designator, the user designator can be more accurately reflected.

And a further advantage of various embodiments is to enable creation of a new avatar designator with an inherited reputation from the user designator, i.e. the accordingly real world person who manipulates the new avatar designator.

Thus it can be seen that separate reputations of a user and his avatar(s) have been provided which eliminates the problems associated with transfer of the avatar. Such separate reputations in accordance with the various embodiments disclosed can provide more realistic computer-enabled environments, which are more reflective of the real world. While several exemplary embodiments have been presented in the foregoing detailed description of the invention, it should be appreciated that a vast number of variations exist, including variations as to the equations used to determine the user reputation and the avatar reputation.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing exemplary embodiments of the invention, it being understood that various changes may be made in the function and arrangement of elements and method of implementation described in an exemplary embodiment without departing from the scope of the invention as set forth in the appended claims.

The invention claimed is:

1. A system in a computer-enabled environment comprising:
    a display monitor that displays a visualized world of the computer-enabled environment;
    a user designator corresponding to a real world user, the user designator having a user reputation and a user rank associated therewith; and
    at least one avatar designator corresponding to a user function in the visualized world of the computer-enabled environment, the avatar designator having an avatar reputation and an avatar rank associated therewith,
    wherein each of the at least one avatar designator is associated with the user designator and is manipulatable by the real world user,
    wherein the user reputation is determined in response to the user rank of the user designator and the avatar rank of each of the at least one avatar designator associated therewith,
    wherein the avatar reputation is determined in response to the avatar rank of the avatar designator and the user rank of the user designator associated therewith, and
    wherein the user rank and the avatar rank are determined independently of each other.

2. The system of claim 1, wherein the user reputation is decreased in response to a transfer-away of an avatar designator associated therewith.

3. The system of claim 1, wherein the user reputation is increased in response to a receipt of a transferred avatar designator.

4. The system of claim 1, wherein the user reputation is determined in response to a set-up of a new avatar designator.

5. The system of claim 1, wherein the avatar reputation is increased in response to a transfer of that avatar designator to a new user designator having a new user reputation greater than a previous user reputation of a previous user designator.

6. The system of claim 1, wherein the avatar reputation is decreased in response to a transfer that avatar designator to a new user designator having a new user reputation less than a previous user reputation of a previous user designator.

7. A method in a computer-enabled environment comprising:
    determining a user reputation of a user designator in response to a user rank of the user designator and an avatar rank of each of at least one avatar designator which is associated with the user designator; and
    determining an avatar reputation of that avatar designator in response to the avatar rank of that designator and the user rank of the user designator,
    wherein the user rank and the avatar rank are determined independently of each other,
    wherein the user designator corresponds to a real world user, the user designator having the user reputation and the user rank associated therewith, the avatar designator corresponds to a user function in a visualized world of the computer-enabled environment, the avatar designator having the avatar reputation and the avatar rank associated therewith, and each of the at least one avatar designator is manipulatable by the real world user.

8. The method of claim 7, wherein the user reputation is decreased in response to a transfer-away of an avatar designator associated therewith.

9. The method of claim 7, wherein the user reputation is increased in response to a receipt of a transferred avatar designator.

10. The method of claim 7, wherein the user reputation is determined in response to a set-up of a new avatar designator.

11. The method of claim 7, wherein the avatar reputation is increased in response to a transfer of that avatar designator to a new user designator having a new user reputation greater than a previous user reputation of a previous user designator.

12. The method of claim 7, wherein the avatar reputation is decreased in response to a transfer that avatar designator to a new user designator having a new user reputation less than a previous user reputation of a previous user designator.

* * * * *